United States Patent
Rutter

[11] Patent Number: 6,112,411
[45] Date of Patent: Sep. 5, 2000

[54] METHOD OF MOUNTING A WHEEL HUB BEARING ASSEMBLY TO THE KNUCKLE OF A VEHICLE SUSPENSION STANDARD

[75] Inventor: Andreas Rutter, Pinerolo, Italy

[73] Assignee: SKF Industrie S.p.A., Turin, Italy

[21] Appl. No.: 09/079,542

[22] Filed: May 15, 1998

[30] Foreign Application Priority Data

May 23, 1997 [IT] Italy ................. TO97A0438

[51] Int. Cl.⁷ ................. B21D 53/10
[52] U.S. Cl. ................. 29/898.07; 29/525; 384/537; 384/539
[58] Field of Search ................. 29/898.07, 525, 29/469.5; 384/537, 539

[56] References Cited

U.S. PATENT DOCUMENTS

| | | | |
|---|---|---|---|
| 3,052,955 | 9/1962 | McAndrews et al. | 29/144.4 |
| 3,702,720 | 11/1972 | Hallerback | 308/236 |
| 4,364,615 | 12/1982 | Euler | 308/236 |
| 4,437,536 | 3/1984 | Colanzi et al. | 180/254 |
| 4,647,230 | 3/1987 | Friedrich et al. | |
| 5,159,754 | 11/1992 | Vancsik | 29/898.07 |
| 5,490,732 | 2/1996 | Hofmann et al. | 384/537 |
| 5,757,084 | 5/1998 | Wagner | 301/105.1 |
| 5,782,565 | 7/1998 | Bertetti et al. | 384/537 |
| 5,782,566 | 7/1998 | Bertetti | 384/537 |
| 6,007,253 | 12/1999 | Rutter | 384/539 |

FOREIGN PATENT DOCUMENTS

| | | |
|---|---|---|
| 0 566 549 | 10/1993 | European Pat. Off. |
| 2 631 402 | 11/1989 | France. |
| 43 12 933 | 10/1994 | Germany. |
| 2130661 | 6/1984 | United Kingdom ............ F16C 35/06 |

*Primary Examiner*—David P. Bryant
*Assistant Examiner*—Essama Omgba
*Attorney, Agent, or Firm*—Merhant & Gould P.C.

[57] ABSTRACT

There is disclosed a method of mounting a wheel hub bearing assembly to the knuckle (10) of a vehicle suspension standard by forcefully inserting the outer race (20) of the bearing in a bore (11) in the knuckle (10). The bore has a groove (15) near its axially outer side to accommodate a snap ring (14) for axially securing the bearing's outer race (20) within the bore (11). Angularly spaced radial slots (24) are provided in the axially outer rim of the knuckle (10); a hub bearing unit is assembled separately. The snap ring (14, 14') is fitted over the hub at an axial location between the axially outer end portion (23) of the bearing outer race (20) and a portion (34) of the hub (16) facing said end portion (23); at least one axially tapered sliding surface (33, 34, 23) is provided between said facing portions (23, 34). The snap ring is radially compressed on the tapered sliding surface to the radial dimension of the knuckle bore, whereby the tapered sliding surface cooperates such that the radial compression of the snap ring sets an axial preloading to the axially inner set of rolling elements (22a). Finally, the hub is pressed to fit the bearing in the knuckle bore and the snap ring into the knuckle groove.

11 Claims, 6 Drawing Sheets

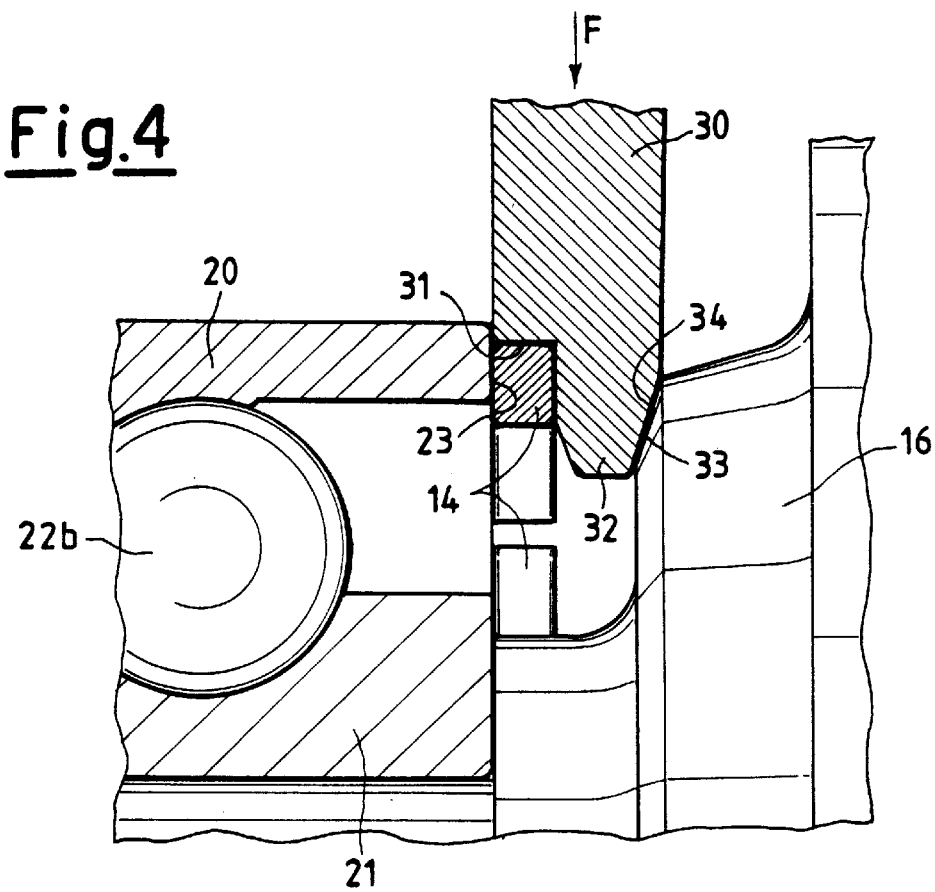
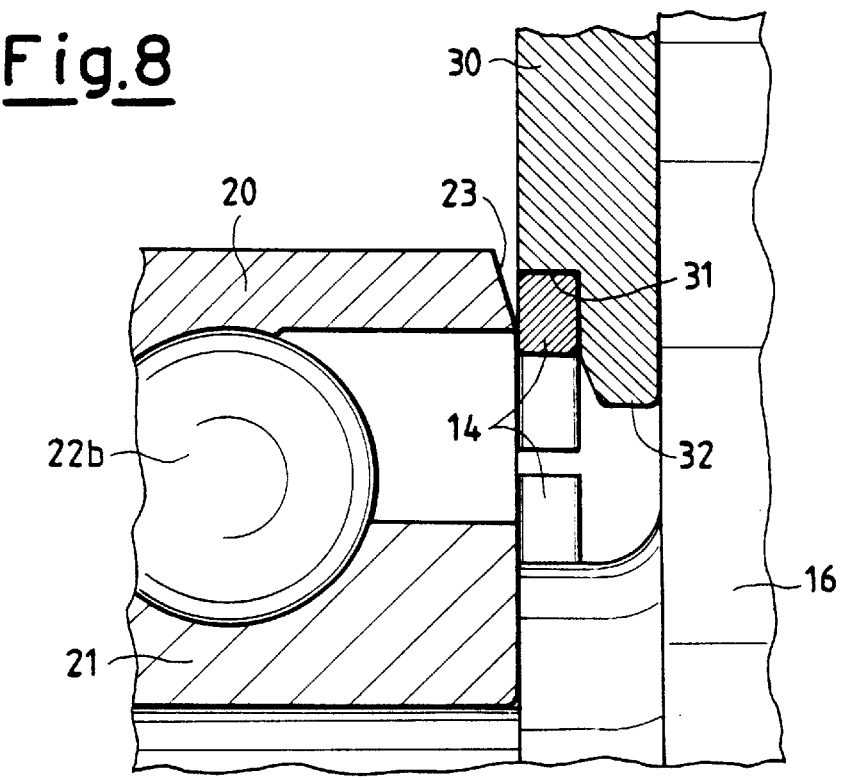

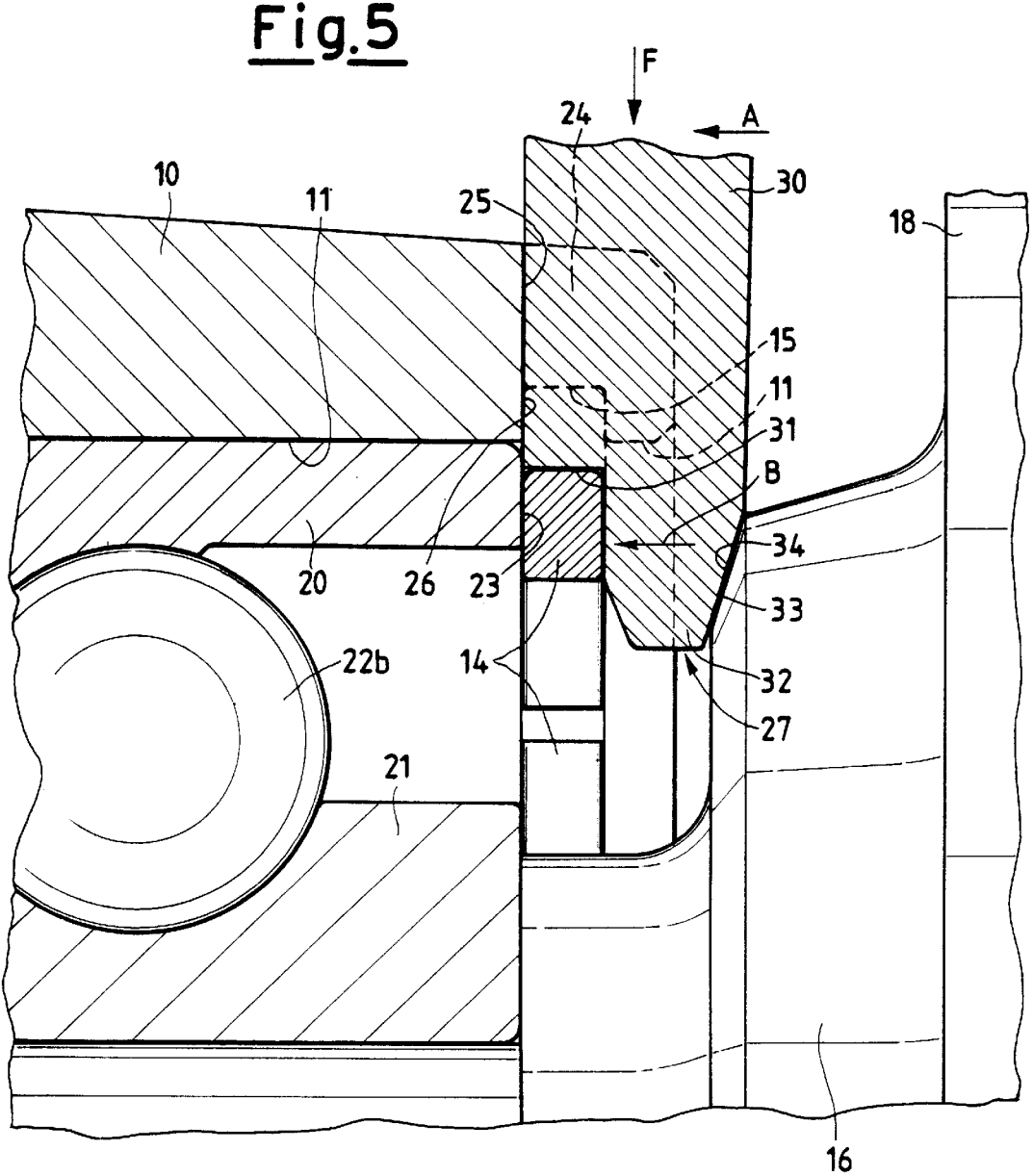

METHOD OF MOUNTING A WHEEL HUB BEARING ASSEMBLY TO THE KNUCKLE OF A VEHICLE SUSPENSION STANDARD

DESCRIPTION

1. Field of the Invention

The present invention falls within the field of mounting a wheel hub bearing assembly to the knuckle or suspension standard of a vehicle. More particularly, the invention relates to the mounting of a hub bearing assembly wherein the outer race of the bearing has an outer cylindrical surface to be interference fitted into a corresponding circular opening formed in the suspension knuckle.

2. Background of the Invention

With reference initially to FIG. 1, there is shown a conventional hub bearing unit mounted to a suspension knuckle designated at 10. In mounting the hub unit, the bearing assembly comprised of a radially outer race 20, two flanked radially inner races 21 and two set of rolling elements 22a, 22b is interference fitted into a knuckle bore 11. Such fitting is attained by pushing the outer race 20 in the axial direction until it reaches an abutment 13 near the axially inner side of the knuckle. As known, the force fit between the bearing outer race and the knuckle has to be very strong such that the hub assembly can withstand high axial stresses in operation without coming off the knuckle or moving with respect thereto.

Generally, in fitting the bearing assembly in the knuckle, high axial forces should not be applied to the inner race of the bearing, as this would create a stress path going from the inner race through the rolling elements and the outer race, whereby the raceways could easily suffer some amount of permanent deformation. Therefore, mounting axial forces are always applied to the outer race directly.

Once the bearing is in position, the outer race is axially secured to the knuckle by means of an axial stopping means such as a snap ring 14 fitted in a circumferential groove 15 formed proximate to the axially outer end of the knuckle bore 11 accommodating the bearing. Then, the hub 16 is fitted within the inner races from the outside and finally the constant velocity joint is mounted from the inner side and tightened with a nut 17a applying a preloading.

At present there is a trend in the industry to mount firstly the bearing assembly to the hub, and then fit the hub bearing assembly as a unit in the knuckle bore. As stated above, it is not allowed to press-fit such a unit in the knuckle by applying a force on the hub, as this would create a stress path through the bearing elements and damage the raceways. On the other hand, when the hub is already coupled to the bearing, it is very difficult to fit a mounting tool between the bearing's outer race and the hub in order to push the outer race into the knuckle bore.

An attempt to solve this problem has been made by forming axial openings or drillings in the hub so as to insert a mounting tool through the hub and reach the outer race directly to push it into the knuckle bore. However, this proposed solution involves the drawback of having to perform said openings in the hub, weakening it. A further problem is that it is difficult to get the snap ring around and over the hub and fit it in place in the knuckle bore groove to prevent the outer race from moving out of the knuckle towards the outside.

SUMMARY OF THE INVENTION

It is an object of the present invention to provide a method of mounting a wheel hub bearing assembly to the knuckle of a vehicle suspension standard capable of overcoming the above discussed prior art drawbacks.

In accordance with one aspect of the invention is a method of mounting a wheel hub bearing assembly to the knuckle of a vehicle suspension standard by forcefully inserting an outer race of a bearing into a bore formed in said knuckle, said bore having a radial groove proximate to an axially outer side thereof for accommodating a snap ring adapted for axially securing the outer race of the bearing within the bore.

The method includes steps of providing a plurality of angularly spaced radial slots or openings in an axially outer rim of the knuckle, separately assembling a hub bearing unit, positioning the snap ring over the hub at an axial location between the axially outer end portion of the outer race of the bearing and a portion of the hub facing said axially outer end portion, providing at least one axially tapered sliding surface between said facing portions, radially compressing the snap ring on said tapered sliding surface at least to the radial dimension of the knuckle bore. The tapered sliding surface cooperates such that the radial compression of the snap ring sets an axial preloading to the axially inner set of rolling elements. The method concludes with pressing the hub in the axially inward direction to fit the hub bearing unit in the knuckle bore and the snap ring into the knuckle groove.

In accordance with another aspect of the invention, a vehicle wheel hub bearing assembly is provided for mounting to the knuckle of a vehicle suspension standard. The wheel hub assembly includes a snap ring that has a radially inner, axially outer end portion so chamfered as to define a tapered surface lying on an ideal axially outwardly diverging conical surface.

In accordance with another aspect of the invention, a mounting tool is provided for mounting a vehicle wheel hub bearing assembly to the knuckle of a vehicle suspension standard. The mounting tool has a plurality of inwardly radially protruding sliding finger members and a seat for holding and radially compressing a snap ring.

In accordance with a further aspect of the invention, a vehicle wheel suspension standard having a knuckle with a knuckle bore for housing a hub bearing assembly is provided. The knuckle bore has a circumferential groove that is proximate to an axially outer side thereof for seating a snap ring adapted for axially securing the bearing outer race within said bore. There are a plurality of angularly spaced radial slots or openings in the axially outer rim of said knuckle around the bore, wherein the slots or openings are dimensioned so as to accommodate a plurality of inwardly radially protruding sliding fingers of a mounting tool.

BRIEF DESCRIPTION OF THE DRAWINGS

In order that the present invention may be well understood there will now be described a few preferred embodiments thereof, given by way of example, reference being made to the accompanying drawings, in which:

FIG. 4 is an enlarged cross sectional view of a first step of the mounting process of this invention;

FIG. 5 is an enlarged cross sectional view similar to that of FIG. 4 showing view a second step of the mounting process of this invention; and FIGS. 6 to 8 are cross sectional views of further variant embodiments of the mounting process of this invention, respectively.

DETAILED DESCRIPTION OF PREFERRED EMBODIMENTS

Figure 1:
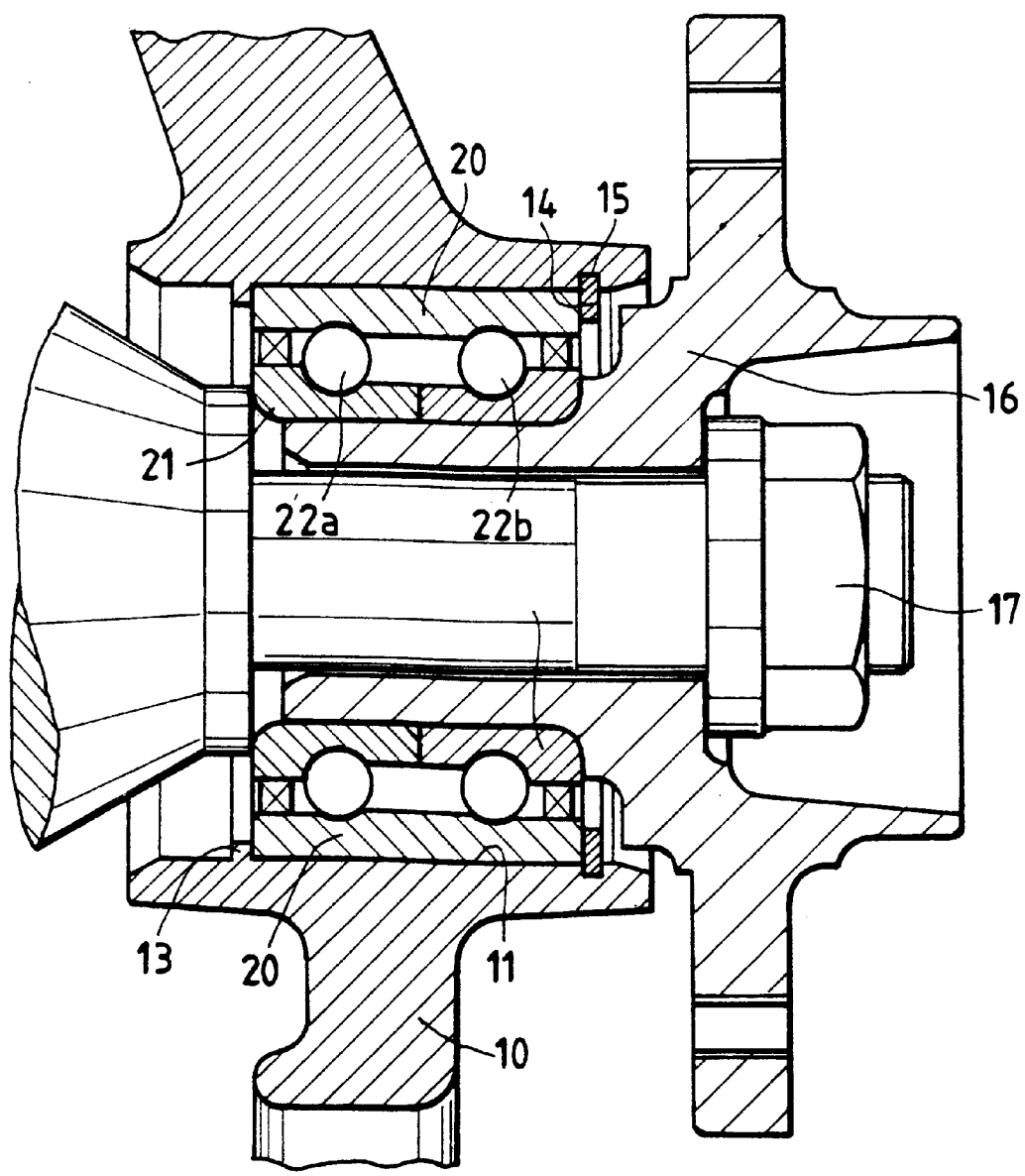
FIG. 1 is an axial cross-sectional view of a conventional hub bearing assembly mounted to a vehicle wheel suspension standard.
Figure 2:
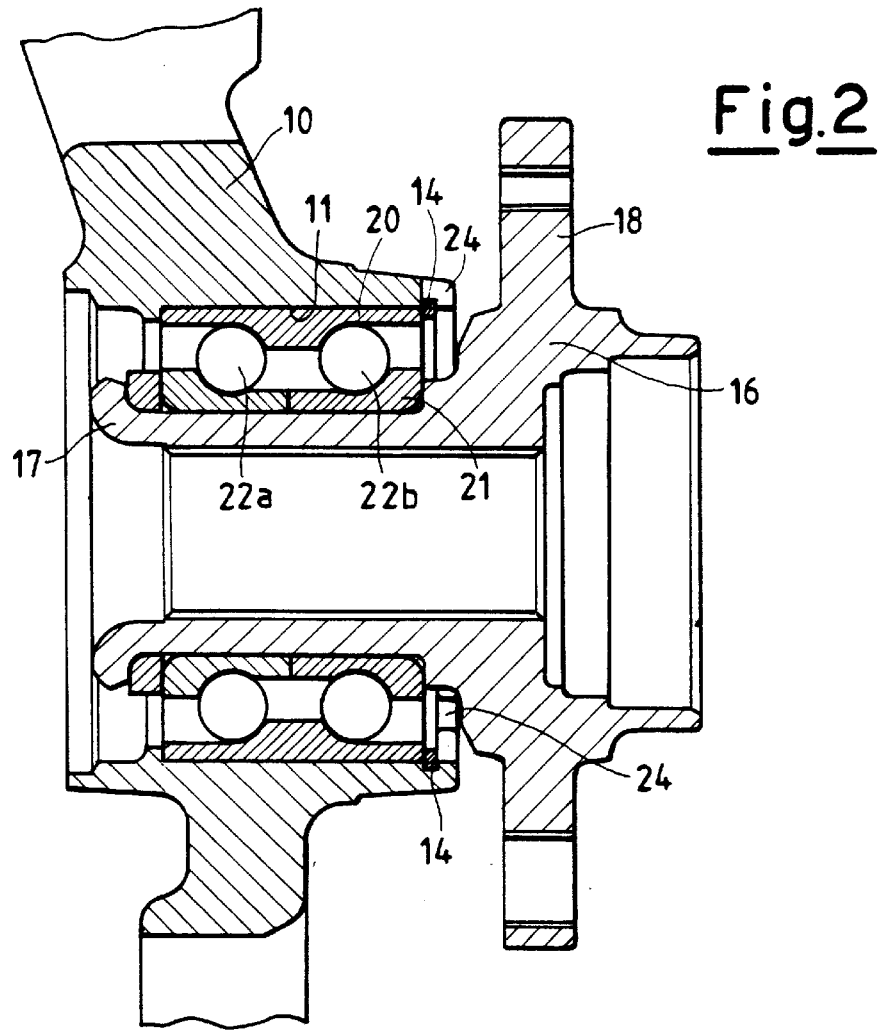
FIG. 2 is an axial cross-sectional view of a hub bearing assembly mounted to a suspension standard in accordance with the present invention.

To mount the hub bearing assembly in the knuckle bore 11 and reach the assembled arrangement of FIG. 2, firstly the bearing assembly 20, 21, 22 is mounted to the hub 16 in known manner, inserting the hub through the bearing and cold forming the axially inner end 17 of the hub so as to secure the radially inner half races 21 to the hub.

Figure 3:
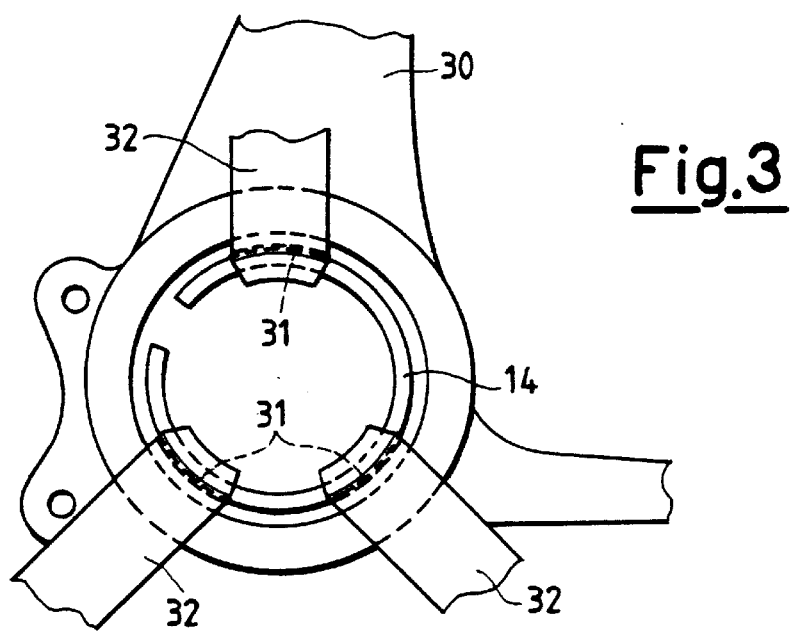
FIG. 3 is a front view schematically showing a snap ring mounting tool according to the present invention.

Referring also to FIGS. 3 and 4, in accordance with a first embodiment of the present invention, a snap ring 14 is held by a special tool 30, described in detail hereinafter, proximate to the axially outer face 23 of outer race 20 between this and the radial hub flange 18 for securing the hub to the vehicle wheel (not shown). This operation can be performed either before the bearing is assembled to the hub or after, by slipping the snap ring 14 over the outer race 20 from the axially inner side (i.e. from the left side in FIG. 2).

According to the present invention, as best seen in FIG. 5, a number of angularly spaced radial slots or openings 24 are formed in the axially outer rim of the knuckle 10. The slots 24 are so formed as to have radial front surfaces 25 substantially flush with or slightly set back (to the left in FIG. 5) to the outwardly facing radial wall 26 of the groove 15 provided in conventional knuckles at the entrance of the bore 11.

As shown in FIGS. 3 to 5, the mounting tool 30 provides a seat 31 for holding the snap ring 14 in a compressed condition. The mounting tool is provided with a plurality of inwardly radially protruding sliding fingers 32 located on one side of seat 31, i.e. on the axially outer side. The end portions of fingers 32 are chamfered on the axially outwardly facing side so as to provide a plurality of inclined sliding surfaces 33 lying on an ideal outwardly diverging conical surface. Chamfered surfaces 33 are designed for sliding along and abutting against a corresponding conical surface 34 obtained in the hub 16 and facing the axially outer face 23 of the bearing outer race 20.

The mounting operation to fit the hub bearing assembly in the knuckle bore 11 and fit the snap ring 14 in the knuckle groove 15 is as follows.

The hub bearing assembly is at first brought into axial alignment with the knuckle bore 11. The mounting tool 30 holding snap ring 14 is brought in the position illustrated in FIG. 4, with the fingers 32 extended in radially inward directions so as to press the snap ring 14 under the radial dimension of the knuckle bore 11. As the fingers extend in the radial direction, the chamfered portions 33 of the fingers come into engagement with the corresponding chamfer 34 on the hub. Upon sliding on and abutting against the hub, the radial sliding motion of the fingers is stopped. Such an abutment sets an axial preloading to the bearing, particularly taking away the clearance on the axially inner set of rolling elements 22a. The radial force F applied by the fingers generates a compression path passing through the hub 16, the tool fingers 32, the snap ring 14, the outer race 20 and the knuckle 10. Such a preloading reduces the axial clearance of the bearing assembly substantially to zero. In this position, no considerable forces are transmitted to the inner races 21 of the bearing, and the axially outer set of rolling elements 22b is in a substantially relieved condition.

In the preferred embodiment of FIG. 4, the mounting tool fingers 32, the snap ring 14, and the chamfer 34 on hub 16 are shaped and dimensioned in such manner that in the abutting position of FIG. 4 the snap ring 14 is at a location as to be axially interposed between the fingers and the front face 23 of outer race 20.

Once the preloading is applied, the whole hub bearing unit is translated in the axially inner direction (as indicated by arrow A in FIG. 5) by pressing on the hub to fit the bearing into the knuckle bore.

When the bearing is in place within the knuckle, usually abutting against a shoulder or snap ring on the axially inner side, the mounting tool fingers 32 are accommodated in the knuckle radial slots 24 abutting against the radial faces 25 knuckle slots 24. Finally, the fingers of the tool are retracted, thereby releasing the snap ring which snaps into the knuckle groove 15.

As will be appreciated, in the foregoing mounting method no forces are applied through the sets of rolling elements, whereby the risk of deforming and damaging the raceways is eliminated.

Optionally, as shown in FIG. 5, a shoulder means such as a safety step 27 can be formed in the hub to stop radial motion of the mounting tool fingers.

Figure 6:
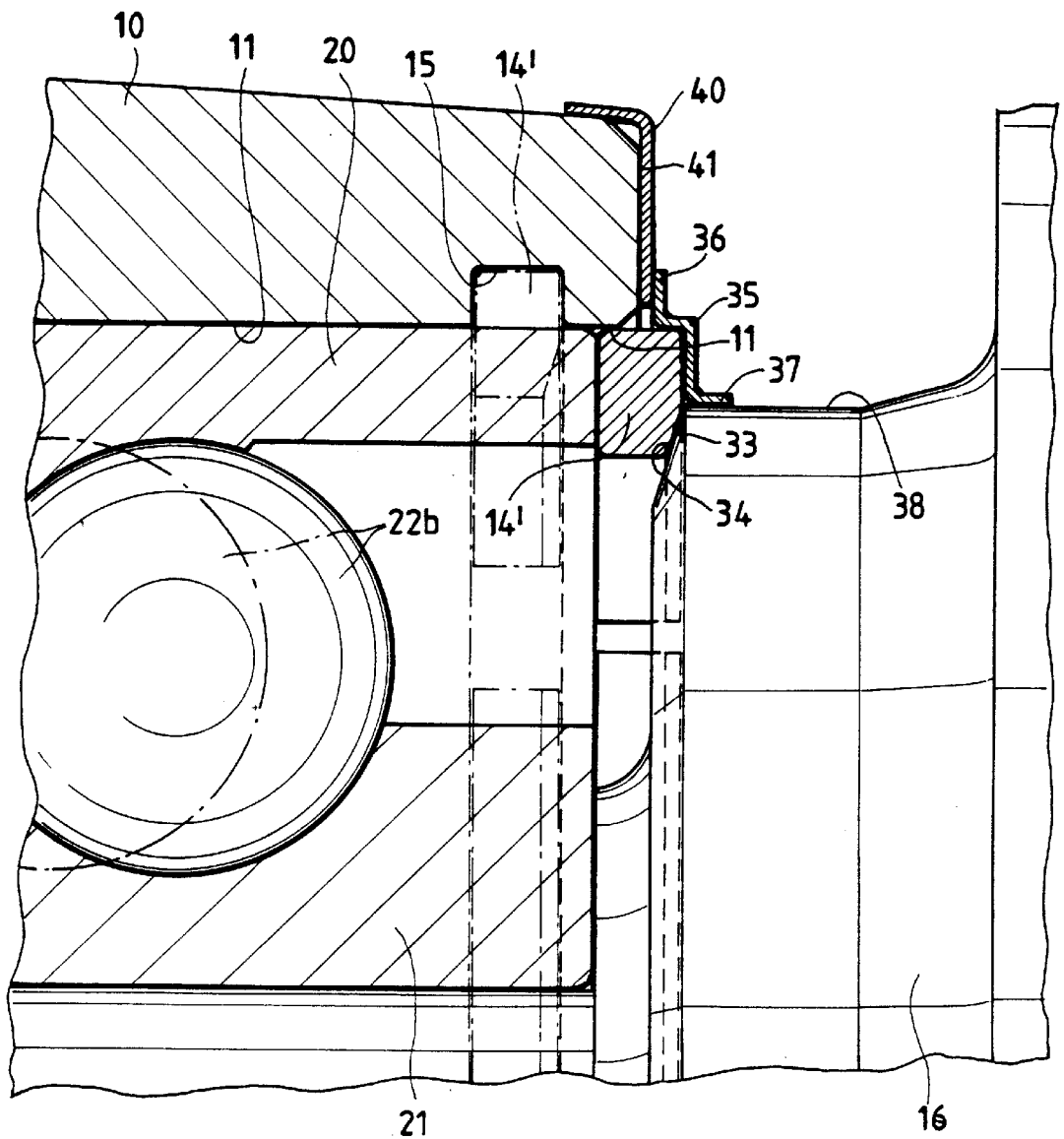

In a variant embodiment of the present invention, as shown in FIG. 6, a chamfered snap ring 14' is used. In a manner similar to the above discussed mounting tool shown in FIGS. 4 and 5, the snap ring 14' of FIG. 6 is chamfered on its axially outer, radially inner side facing the hub. In this variant, the snap ring is fitted over the hub prior to mounting the bearing, and then the bearing is fitted on the hub and secured thereto in known manner, e.g. by cold forming the axially inner end of the hub. A mounting tool (not shown) similar to that of FIGS. 4 and 5 is used to radially compress snap ring 14' between the outer race and the hub. The chamfer 33 on the snap ring being compressed determines an axial preloading taking away the clearance of the bearing assembly. After that, a retaining sleeve 35 of annular shape is inserted over snap ring 14' mounting it to the hub 16 in a compressed condition, with a slight interference or clearance under the radial dimension of the knuckle bore 11. The retaining sleeve has a portion 36 radially protruding beyond the radius of the knuckle bore and a cylindrical portion 37 coaxially fitted over a cylindrical portion 38 of the hub. A removable axial spacer means 40 is fitted on the outer face 41 of the knuckle.

To mount the bearing assembly in the knuckle, the hub is pressed in the axially inner direction, i.e. to the left in FIG. 6. As the hub slides in said direction, it pushes the outer race 20 in the knuckle bore 11 via the snap ring 14'. At a certain point, the radially protruding portion 36 of the retaining sleeve 35 abuts the axial spacer 40. In sliding the bearing hub assembly further, the sleeve 35 is pushed along the cylindrical portion 38 of the hub in the axially outer direction until the bearing is fully fitted inside the knuckle bore. At this point, the snap ring 14' snaps in the knuckle groove 15. To prevent the sleeve 35 from touching the stationary knuckle as it rotates with the hub in operation, the spacer insert 40 on the end face of the knuckle is removed, leaving an axial gap between the sleeve (on the rotating hub) and the knuckle.

Preferably, the removable spacer 40 and/or the retaining sleeve 35 can be constructed as one or more substantially U-shaped removable forks that can be easily slipped on the knuckle and the hub, respectively, before assembly and pulled off once the hub bearing unit is in place.

In a still different embodiment, another separate retaining tool (not shown) can be used instead of the sleeve 35 to keep the snap ring provisionally compressed as the hub bearing assembly is pushed into the knuckle bore.

According to a further variant embodiment, the snap ring can be pre-mounted in a compressed condition onto the hub and kept in this position by fitting the retaining sleeve over it. Then, the hub bearing assembly is pressed as a unit in the knuckle bore. In this latter case, the axial dimension of the snap ring will have to be gauged such as to set a preloading on the bearing through the snap ring and the outer race, and not through the bearing inner race.

Figure 7:
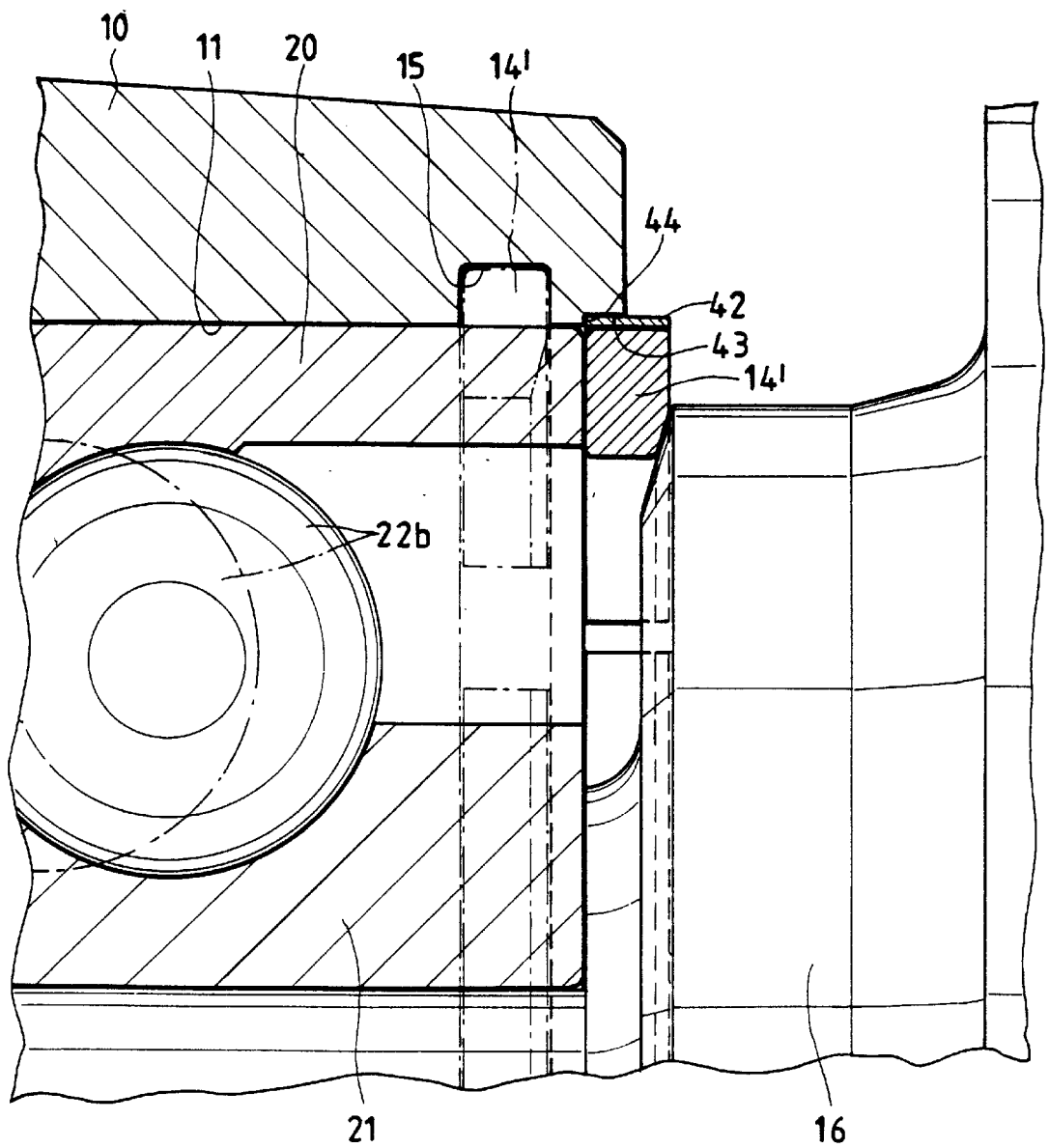

Still in accordance with the present invention, a further embodiment of the mounting method is illustrated in FIG. 7. In this variant, a chamfered snap ring 14' is mounted loose over the hub bearing assembly, between the outer face of outer race 20 and the hub. Then, the snap ring is compressed to or slightly under the knuckle bore dimension by fitting a tubular sleeve 42 over it. At the edge of the knuckle bore there is formed a circumferential recess 43 having a radial surface 44 acting as an abutment for the tubular sleeve 42. As for the previously disclosed embodiments, the radial compression of chamfered snap ring 14' sets an axial preloading on the bearing assembly, taking away the clearance on the axially inner set of rolling elements 22a and relieving the axially outer one 22b, in a way such that the axial forces applied to the hub will be transmitted from the hub through the snap ring and the outer race and push the latter in the knuckle bore without damaging the raceways. In shifting the assembly in the bore, the tubular sleeve abuts against the radial surface 44 of circumferential recess 43, whereby the snap ring slides inwardly along the inside of tubular sleeve 42 and knuckle bore 11 until the bearing is fully fitted in the knuckle. At this point, the snap ring is free to snap-fit in the knuckle groove 15. The tubular sleeve 42, preferably made of plastic material, will remain fitted inside the knuckle recess 43. As apparent, this embodiment avoids to have to use an axial spacer member as discussed with reference to FIG. 6.

While specific embodiments of the invention have been disclosed, it is to be understood that such disclosure has been merely for the purpose of illustration and that the invention is not to be limited in any manner thereby. Various modifications will be apparent to those skilled in the art in view of the foregoing embodiments. For example, instead of providing chamfers on both the snap ring and the hub, or on both the mounting tool fingers and the hub, said chamfers can be formed in only one of said these engaging parts, provided that the chamfer is effective in setting an axial preloading on the bearing upon tightening the mounting tool fingers or snap ring radially.

Finally, it is to be understood that the basic principle underlying this invention could also be implemented by forming the axially outer surface 23 of the outer race 20 as an axially inwardly diverging conical surface (as schematically shown in FIG. 8), thereby accomplishing the same advantages of the previously disclosed embodiments.

What is claimed is:

1. A method of mounting a wheel hub bearing assembly to the knuckle of a vehicle suspension standard by forcefully inserting an outer race of a bearing in a bore formed in said knuckle, said bore having a radial groove proximate to an axially outer side thereof for accommodating a snap ring adapted for axially securing the outer race of the bearing within said bore, the method comprising the steps of:
providing a plurality of angularly spaced radial slots or openings in an axially outer rim of said knuckle;
separately assembling a hub bearing unit;
positioning said snap ring over the hub at an axial location between a axially outer end portion of the outer race of the bearing and a portion of the hub facing said axially outer end portion;
providing at least one axially tapered sliding surface between said facing portions;
radially compressing said snap ring on said tapered sliding surface at least to the radial dimension of the knuckle bore, whereby said tapered sliding surface cooperates such that the radial compression of the snap ring sets an axial preloading to a axially inner set of rolling elements such that said axially tapered sliding surface is introduced into said angularly spaced radial slots or openings; and
pressing the hub in the axially inward direction to fit the hub bearing unit in the knuckle bore and the snap ring into the knuckle groove.

2. The mounting method of claim 1, wherein said at least one tapered sliding surface consists of a plurality of inclined surfaces lying on an ideal axially outwardly diverging conical surface, said inclined surfaces being formed on the end portions a plurality of inwardly radially protruding sliding fingers of a mounting tool for holding and radially compressing said snap ring.

3. The mounting method of claim 1, wherein said at least one tapered sliding surface consists of an outwardly diverging conically chamfered surface formed on the radially inner, axially outer portion of said snap ring.

4. The mounting method of claim 3, further comprising the step of:
inserting a retaining sleeve of annular shape over said snap ring for mounting it to the hub in a compressed condition.

5. The mounting method of claim 4, wherein said retaining sleeve has a portion radially protruding beyond the radius of the knuckle bore and a cylindrical portion coaxially fitted over a cylindrical portion of the hub.

6. The mounting method of claim 5, further comprising the step of:
fitting a removable axial spacer means on the outer face of the knuckle.

7. The mounting method of claim 6, wherein said step of pressing the hub in the axially inner direction further comprises the steps of:
bringing the radially protruding portion of said retaining sleeve in abutment against said axial spacer means,
pushing the bearing hub assembly further so as to push said sleeve along said cylindrical hub portion;
removing said spacer insert from the knuckle so as to leave an axial gap between the sleeve and the knuckle.

8. The mounting method of claim 4, wherein a removable spacer and/or said retaining sleeve are constructed as one or more substantially U-shaped removable forks.

9. The mounting method of claim 4, further comprising the steps of:
providing a circumferential recess at the edge of the knuckle bore and a radial abutment surface at said recess;
inserting a retaining sleeve of tubular shape over said snap ring for mounting it to the hub in a compressed condition;
pressing said hub bearing assembly in the knuckle bore, bringing said tubular sleeve in abutment against said radial surface; and
pressing the bearing hub assembly further so as to slide said snap ring inwardly along the inside of tubular sleeve and knuckle bore until the hub bearing unit is fully fitted in the knuckle.

10. The mounting method of claim 1, wherein said at least one tapered sliding surface consists of an outwardly diverging conically chamfered surface formed on the hub and facing the axially outer face of the bearing outer race.

11. The mounting method of claim 1, wherein said at least one tapered sliding surface consists of axially inwardly diverging conical surface formed on the axially outer face of the bearing outer race.

* * * * *